No. 694,747. Patented Mar. 4, 1902.
E. HIMMELMAN.
FRUIT JAR HOLDER.
(Application filed July 5, 1901.)
(No Model.)
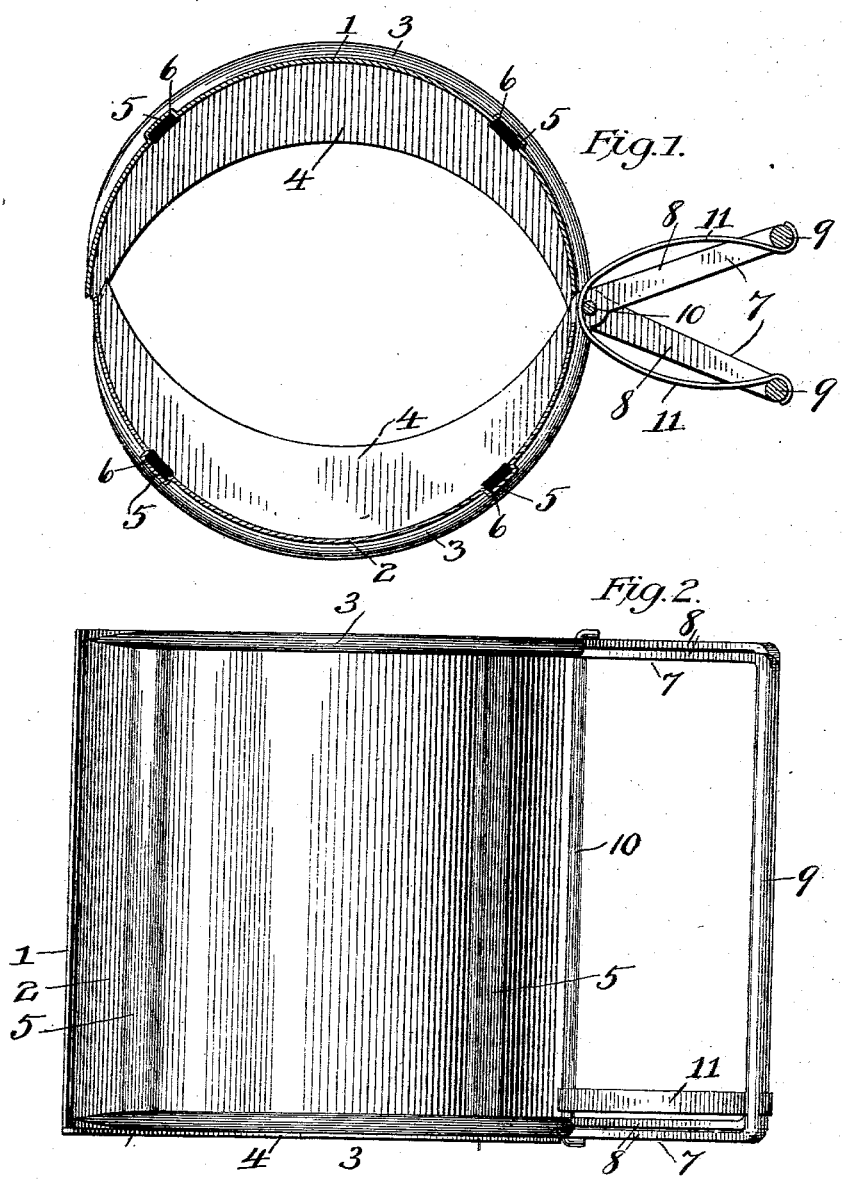
Witnesses:
George A. Heaman
Charles T. Kellogg
Inventor:
Ernest Himmelman

United States Patent Office.

ERNEST HIMMELMAN, OF LEROY, NEW YORK.

FRUIT-JAR HOLDER.

SPECIFICATION forming part of Letters Patent No. 694,747, dated March 4, 1902.

Application filed July 5, 1901. Serial No. 67,192. (No model.)

*To all whom it may concern:*

Be it known that I, ERNEST HIMMELMAN, a citizen of the United States, residing at Leroy, in the county of Genesee and State of New York, have invented a new and useful Fruit-Jar Holder, of which the following is a specification.

My invention relates to improvements in fruit-jar holders, and has for its object to provide a device whereby hot fruit-jars may be handled without burning the hands.

My invention consists in the construction, combination, and arrangement of the several parts hereinafter described and claimed.

Referring to the drawings, Figure 1 is a central horizontal sectional view of my invention, showing the jaws clamped together; and Fig. 2 a side elevation.

In the drawings in which like letters of reference denote like parts throughout the several views, 1 and 2 represent two curved clamping-jaws their upper and lower edges provided with flanges 3 for holding them in shape, said flanges being formed by turning over the upper and lower edges of the jaws upon pieces of wire.

4 are ledges extending inwardly a short distance from their lower edges, upon which a jar is adapted to be supported.

5 are vertical depressions or channels in the inner circumference of the jaws in which are seated strips of rubber 6 for engaging and holding the jar, thus preventing it from turning around when tightening or loosening the cover of the jar.

7 are handles comprising horizontal arms 8 extending from the upper and lower edges of the jaws and connected by vertical bar 9, the arms of one jaw crossing the arms of the other jaw and pivoted together by a pin 10.

11 is a spring, one end connected to the handle of one jaw and the other end connected to the handle of the other jaw for pressing the handles apart and normally holding the jaws open.

When it is desired to use the fruit-jar holder, the handles, which are normally held open by the pressure of the spring, are grasped by the hand and the jaws passed over a jar. The handles are then pressed toward each other, which causes the ledges to pass under the bottom of the jar and support it and the jaws to grasp the sides of the jar and firmly clamp it. When it is desired to remove the holder from the jar, it is only necessary to relax the grasp on the handles, when the jaws will spring open automatically, and the holder may then be withdrawn from the jar.

If it is desired to decrease the size of the holder still more than is shown in the drawings, the handles can be pressed nearer together, which will cause the outer edges of the jaws to overlap each other and also the outer ends of the ledges to overlap.

Although I have described the jar-holder as applicable for use with fruit-jars, it may be used equally as well with cans or other vessels, and although I have herein set forth a construction, combination, and arrangement of parts whereby the objects of my invention may be accomplished it comes within the spirit of my invention to depart somewhat therefrom.

Having thus described my invention, what I claim is—

1. A jar-holder comprising clamping-jaws having handles, said handles being pivoted together at the rear of the jaws, and inwardly-projecting ledges on said jaws made to conform to the shape of a jar for the purpose of allowing said ledges to be passed over and support the same, substantially as described.

2. A jar-holder comprising a pair of clamping-jaws having handles projecting therefrom pivoted together at the rear of the jaws, ledges extending inwardly from the lower edges of said jaws each of which is curved so as to allow said ledges to be passed over a jar, and means for automatically opening said jaws, substantially as described.

3. A jar-holder comprising a pair of clamping-jaws having arms projecting from the upper and lower edges thereof, said arms being pivoted together, each connected by a bar, and means for automatically opening said jaws comprising a spring the opposite ends of which are attached to the bars which connect the arms, substantially as described.

4. A jar-holder comprising a pair of clamping-jaws having arms projecting from the upper and lower edges thereof, said arms being connected together by a bar, and said arms being pivoted together at the rear of said jaws, and ledges curved so as to adapt them to be passed over a jar when the jaws are open, and to engage the bottom of a jar and support it when the jaws are closed, substantially as described.

5. A jar-holder comprising clamping-jaws having a pair of arms projecting from both the upper and lower edges thereof which cross each other, one arm of each pair connected to the arm of the other pair by a bar, said arms being pivoted together at the rear of said jaws, and ledges extending from said jaws curved so as to adapt them to pass over and support a jar substantially as described.

6. A jar-holder comprising a pair of clamping-jaws having arms projecting from both the upper and lower edges thereof, said arms pivoted together and the ends each connected by a bar, means attached to the bar of each arm for automatically opening said jaws, and ledges adapted to pass over and support a jar substantially as described.

In testimony whereof I have signed my name to this specification in the presence of two subscribing witnesses.

ERNEST HIMMELMAN.

Witnesses:
CHARLES F. KELLOGG,
HARRY H. FALKNER.